(12) United States Patent
Miller et al.

(10) Patent No.: US 7,305,491 B2
(45) Date of Patent: Dec. 4, 2007

(54) TECHNIQUES FOR HANDLING TIME ZONE CHANGES IN PERSONAL INFORMATION MANAGEMENT SOFTWARE

(75) Inventors: David Miller, Nashua, NH (US); Alex Shore, Danville, NH (US)

(73) Assignee: Intellisync Corporation, San Jose, CA (US)

( * ) Notice: Subject to any disclaimer, the term of this patent is extended or adjusted under 35 U.S.C. 154(b) by 706 days.

(21) Appl. No.: 10/188,813

(22) Filed: Jul. 2, 2002

(65) Prior Publication Data

US 2003/0054325 A1    Mar. 20, 2003

Related U.S. Application Data

(60) Provisional application No. 60/302,521, filed on Jul. 2, 2001.

(51) Int. Cl.
- *G06F 15/16* (2006.01)
- *G04B 19/22* (2006.01)
- *H04Q 7/20* (2006.01)
- *G06F 15/177* (2006.01)
- *G04B 25/00* (2006.01)

(52) U.S. Cl. .......... 709/248; 709/221; 368/21; 368/185; 713/502; 455/456.1; 455/456.3

(58) Field of Classification Search .......... 709/221, 709/223, 228, 248; 368/21, 185; 713/502; 455/456.1, 456.2, 456.3
See application file for complete search history.

(56) References Cited

U.S. PATENT DOCUMENTS

| | | | |
|---|---|---|---|
| 5,634,100 A | * | 5/1997 | Capps .......... 705/9 |
| 5,835,909 A | * | 11/1998 | Alter .......... 707/101 |
| 5,873,108 A | * | 2/1999 | Goyal et al. .......... 715/507 |
| 5,930,501 A | * | 7/1999 | Neil .......... 713/400 |
| 6,016,478 A |   | 1/2000 | Zhang et al. |
| 6,034,683 A | * | 3/2000 | Mansour et al. .......... 715/764 |
| 6,085,098 A |   | 7/2000 | Moon et al. |
| 6,085,166 A |   | 7/2000 | Beckhardt et al. |
| 6,101,480 A |   | 8/2000 | Conmy et al. |
| 6,104,788 A | * | 8/2000 | Shaffer et al. .......... 379/93.17 |
| 6,108,640 A | * | 8/2000 | Slotznick .......... 705/26 |

(Continued)

FOREIGN PATENT DOCUMENTS

EP    1 038 560 A2    9/2000

(Continued)

OTHER PUBLICATIONS

Pihkala, Kari. "Synchronization," TML Research Seminar on Digital Media: Pervasive Computing, Chapter 17, Fall 2001, pp. 1-10.*

(Continued)

*Primary Examiner*—Melvin H. Pollack
(74) *Attorney, Agent, or Firm*—Alston & Bird LLP

(57) ABSTRACT

A computer implemented method of providing time-zone capability to existing personal information management (PIM) software that lacks time-zone capability, the method comprising: executing the existing PIM software; executing a time-zone application in parallel with the existing PIM software, wherein the time-zone application determines that there has been a change in time zone; and changes times of appointments stored in the PIM software to reflect the new time zone.

18 Claims, 5 Drawing Sheets

U.S. PATENT DOCUMENTS

| | | | |
|---|---|---|---|
| 6,111,572 A | 8/2000 | Blair et al. | |
| 6,119,167 A * | 9/2000 | Boyle et al. | 709/234 |
| 6,141,005 A | 10/2000 | Hetherington et al. | |
| 6,147,693 A | 11/2000 | Yunker | |
| 6,198,696 B1 * | 3/2001 | Korpi et al. | 368/21 |
| 6,208,996 B1 * | 3/2001 | Ben-Shachar et al. | 707/104.1 |
| 6,266,295 B1 * | 7/2001 | Parker et al. | 368/28 |
| 6,282,294 B1 * | 8/2001 | Deo et al. | 380/270 |
| 6,484,033 B2 * | 11/2002 | Murray | 455/456.3 |
| 6,556,222 B1 * | 4/2003 | Narayanaswami | 715/786 |
| 6,587,398 B1 * | 7/2003 | Mock et al. | 368/21 |
| 6,647,370 B1 * | 11/2003 | Fu et al. | 705/8 |
| 6,671,757 B1 * | 12/2003 | Multer et al. | 710/100 |
| 6,760,728 B1 * | 7/2004 | Osborn | 707/10 |
| 6,828,989 B2 * | 12/2004 | Cortright | 715/769 |
| 6,831,970 B1 * | 12/2004 | Awada et al. | 379/201.01 |
| 6,879,996 B1 * | 4/2005 | Laves | 709/206 |
| 6,950,662 B2 * | 9/2005 | Kumar | 455/456.3 |
| 6,958,692 B1 * | 10/2005 | Ratschunas | 340/539.13 |
| 6,959,192 B1 * | 10/2005 | Cannon et al. | 455/456.3 |
| 7,035,878 B1 * | 4/2006 | Multer et al. | 707/201 |
| 7,082,402 B2 * | 7/2006 | Conmy et al. | 705/8 |
| 7,096,029 B1 * | 8/2006 | Parupudi et al. | 455/456.1 |
| 7,188,073 B1 * | 3/2007 | Tam et al. | 705/9 |
| 2001/0008404 A1 * | 7/2001 | Naito et al. | 345/745 |
| 2002/0010610 A1 * | 1/2002 | Jacobs et al. | 705/8 |
| 2002/0055351 A1 | 5/2002 | Elsey et al. | |
| 2002/0069298 A1 * | 6/2002 | Birkler et al. | 709/248 |
| 2002/0145944 A1 * | 10/2002 | Wright | 368/21 |
| 2003/0004776 A1 * | 1/2003 | Perrella et al. | 705/9 |
| 2003/0034958 A1 * | 2/2003 | Waesterfid et al. | 345/158 |

FOREIGN PATENT DOCUMENTS

WO      00/76217 A1     12/2000

OTHER PUBLICATIONS

Lewis, Ted. "Information Appliances: Gadget Netopia," Computer, Jan. 1998, pp. 59-68.*

Product Guide: "Getting Started with Palm m100 Series Handhelds," Palm Inc. 2001, pp. 1-24.*

Product Guide: "Handbook for Palm m100 Series Handhelds," Palm Inc. 2001, pp. 67-79, 96, 98-113.*

Product Guide: "HP Jornada 560 Series Personal Digital Assistant," Hewlett-Packard Company 2001, pp. 97-101.*

Dawson, Frank and Scales, James. "3rd Generation Partnership Project; Technical Specification Group Terminals (TSG-T); External Standards Impact on the IrMC Specification," pp. 1-12.*

"Time Traveler Borchure" from Class Action P/L, Jun. 19, 2000, with media release notes and Internet Archive Printouts to establish time period of the art and usage of the program.*

"Travel Tracker brochure" from SilverWARE, Sep. 12, 2000, with media release notes to establish time period.*

"Pocket PC calendar does not correct time zone changes," Microsoft Article Q268249, Aug. 18, 2005, pp. 1-2.*

"Sharp Electronic Organizer Wizard Operation Manual," pp. 1-43, no date find.*

* cited by examiner

TECHNIQUES FOR HANDLING TIME ZONE CHANGES IN PERSONAL INFORMATION MANAGEMENT SOFTWARE

CROSS-REFERENCE TO RELATED APPLICATION

This application claims benefit of priority from U.S. Provisional Application Ser. No. 60/302,521, filed on Jul. 2, 2001, which is incorporated herein by reference in its entirety.

TECHNICAL FIELD

This invention relates to personal information management software of the type used for recording appointments and other calendar events.

BACKGROUND

Personal information management (PIM) software is widely used today for recording appointments and other calendar events. PIM software is used on both desktop computers and handheld computing devices. Often, the PIM database on one computer will be synchronized with a PIM database on another computer. Some PIM software includes enterprise synchronizing and scheduling capabilities that synchronize PIM databases for users across an enterprise, or that schedule meetings for multiple participants in the enterprise.

Some PIM software, typically software intended for desktop use, represents the time of appointments in universal time (UTC), which is equivalent to Greenwich Mean Time (GMT). Microsoft Outlook, for example, makes all time entries into its PIM database in universal time (UTC). The actual time that a user sees varies with the time zone setting of the user's software. This arrangement has the advantage that when a user changes time zones (e.g., as a consequence of traveling), his appointments can readily be adjusted to appear in the local time of that time zone merely by entering the new time zone. Also, when PIM databases across an enterprise are synchronized, or appointments scheduled using scheduling software, the different time zones of users in the enterprise are automatically taken into account.

Other PIM software, e.g., the Palm OS, a very widely used PIM software for handheld devices, represents appointments in local time. No provision is made for time zones. As long as the user does not move between time zones, and only synchronizes with another PIM database in the same time zone (e.g., between his desktop and handheld), this limitation is not a practical problem. The latest version of the Palm OS (Version 4.0) has added a limited time-zone capability that allows a user to change his time zone, but making such a change has no effect on appointments, which remain at the local time at which they were first entered.

SUMMARY

The inventors have found a practical method of adding time-zone capability to existing PIM software that lacks such capability. A separate time-zone application runs in parallel with the existing PIM software. When the time-zone application determines that the user's time zone has changed, it changes appointments in the PIM database to reflect the new time zone.

In a first aspect, an embodiment of the invention features a computer implemented method of providing time-zone capability to existing personal information management (PIM) software that lacks time-zone capability. The method comprises: executing the existing PIM software; executing a time-zone application in parallel with the existing PIM software, wherein the time-zone application determines that there has been a change in time zone; and changes times of appointments stored in the PIM software to reflect the new time zone.

In a second aspect, an embodiment of the invention features computer software including at least one computer-readable storage medium having computer-readable program code portions stored therein. The computer-readable program code portions include executable portions for providing time-zone capability to existing personal information management (PIM) software that lacks time-zone capability. The code portions comprise instructions for executing the existing PIM software; executing a time-zone application in parallel with the existing PIM software, wherein the time-zone application determines that there has been a change in time zone; and changes times of appointments stored in the PIM software to reflect the new time zone.

In preferred implementations of the invention, one or more of the following features may be incorporated.

A user of the software may pick a default time zone at the outset of using the time-zone application.

The time-zone application may choose a default time zone based on the local clock time of the device to which the time-zone application is initially downloaded.

Daylight savings time adjustments to appointments stored in the PIM software may be made either automatically or with a prompt to a user asking if the adjustment should be made.

The creation time and date of e-mails may be adjusted to reflect changes in time zone. For example, e-mails stored in a user's outbox in the e-mail software, but not yet sent, may be adjusted in response to a time zone change.

Time zone changes to appointments may be effected by adjustment to the system clock of the device operating the software.

The software may give a user the option of not changing appointment records in the PIM software upon changing time zones.

The existing PIM software may lack the capability to store an appointment that crosses a day boundary, so that the start time of the appointment is in one day, and the end time of the appointment is in a following day, and the time-zone application may enter the correct start time for the time-zone adjusted appointment, but an end time for the time-zone adjusted appointment that is within the same day, and the time-zone application may enter an appointment duration in a separate field of the appointment record.

The separate field may comprise one of the Note field, the appointment description field, and an application specific field made available by the API of the PIM software.

When the time zone changes so that the appointment no longer crosses a day boundary, the time-zone application may read the duration stored in the separate field, and use the duration to determine the correct end time for the appointment.

The time-zone application may thereafter remove the appointment duration data from the separate field in which it was stored.

The end time used for time-zone adjusted appointments that cross a day boundary may be a time ending near midnight that a user would not ordinarily use for an ending time for an appointment.

An appointment that crosses a day boundary may repeated on both the start and stop day.

The appointment stored for the second day may not be accurate at a view level that shows start and stop times but accurate at a higher level view.

The higher level view may comprise a view that only indicates whether an appointment exists on a particular day.

The time-zone application may communicate with a server to which the existing PIM software synchronizes, and wherein the time-zone application may be interrogated by the server and provide the server with the time zone of the appointments stored in the existing PIM software.

The server may use the time zone acquired from the device running the existing PIM software to convert the times of appointments in the server to a universal time when processing the appointments in the synchronization.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
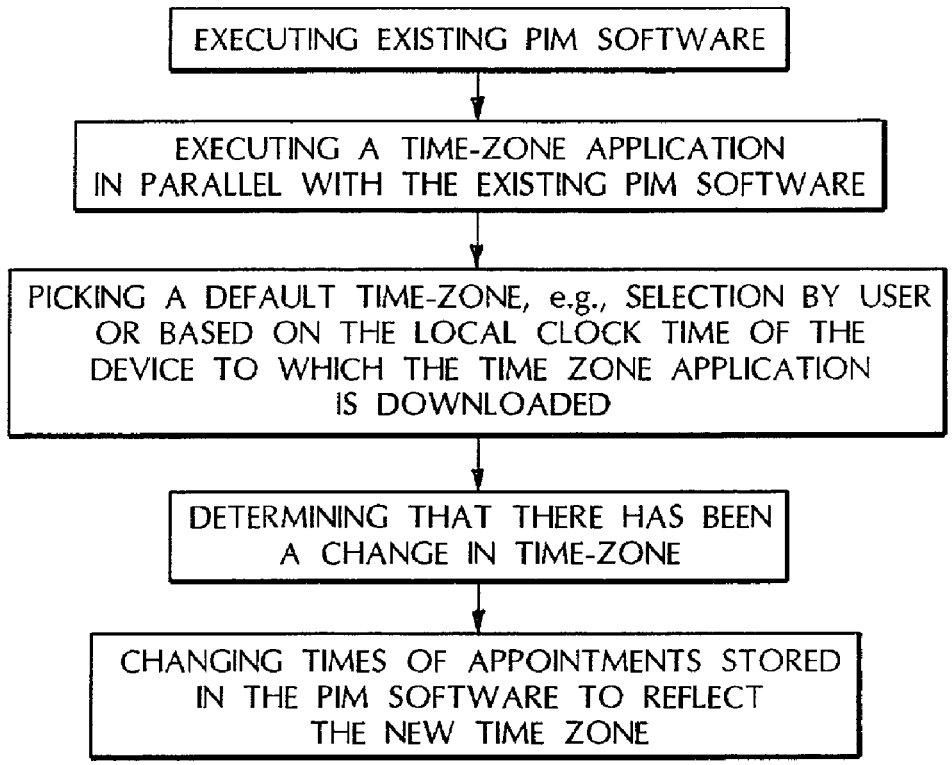
FIG. 1 is a flow chart for a preferred embodiment of the invention.
Figure 2:
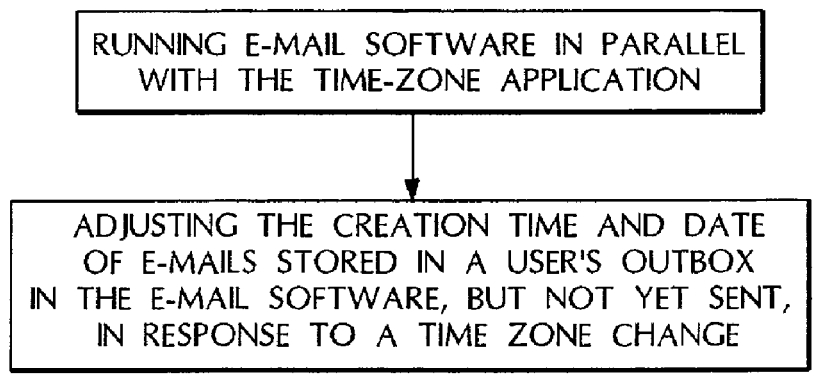
FIG. 2 is a flow chart for a preferred embodiment in which e-mail creation times are adjusted.
Figure 3:
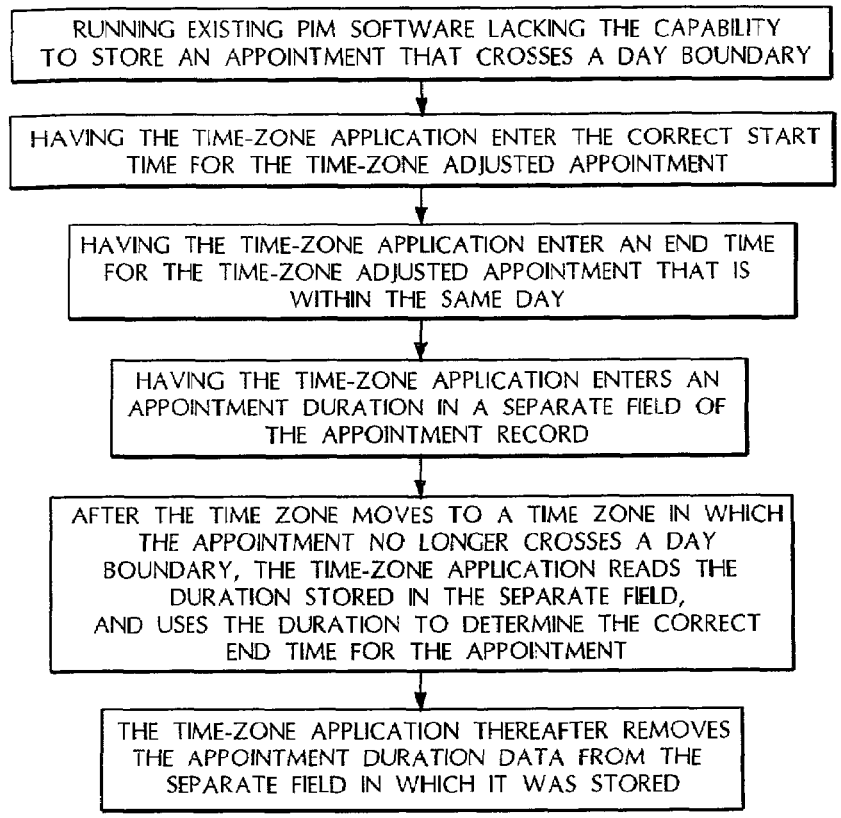
FIG. 3 is a flow chart for a preferred embodiment in which appointments crossing an end of day boundary are handled by the invention.
Figure 4:
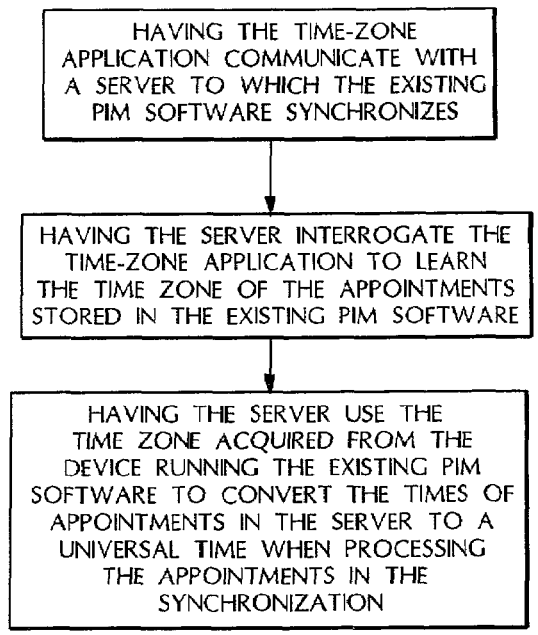
FIG. 4 is a flow chart for a preferred embodiment in which time zone information is provided to a server with which the PIM database is being synchronized.

Preferred embodiments of the invention may incorporate one or more of the following features:

User picks the default time zone at outset of using time-zone application, or the application chooses a default time zone based on the local clock time of the device to which the software is initially downloaded.

Daylight savings time adjustments are made either automatically or with a prompt to the user asking if the adjustment should be made. When the adjustments are made, changes are made to appointments in the PIM database.

The creation time and date of e-mails stored in a user's outbox, but not yet sent, is adjusted in response to the time zone change.

The system clock of the device is adjusted. This is all that is adjusted in the case of some PIM software that has limited time-zone capability.

The user is given the option of not changing records in the PIM database upon changing time zones. This helpful to deal with a problem that the user may have.

When a time zone change causes an appointment to span across more than one day, e.g., an existing appointment for 8 pm to 11 pm in the Pacific Time Zone of the United States becomes an appointment for 11 pm to 2 am when the user moves to the Eastern Time Zone, the software has the capability of handling the change even when the PIM software is incapable of recording an appointment that crosses a day boundary. The software will also restore the original appointments to their original times when the user moves back to his original time zone, in which the appointment does not cross a day boundary. What the software does, when the adjusted appointment begins on one day and ends on the next, is enter an appointment that runs from the correct start time to an end time that is within the same day, and enter an appointment duration in a separate field. Typically, the field used is the Note field, but the duration could be entered in the appointment description field, or in an application specific field made available by the API of the PIM software. When the user moves to a time zone (e.g., the original zone) in which the appointment no longer bridges a day boundary, the duration entry is read, used to determine the correct ending time for the appointment, and removed from the field in which it was stored. A technique that can be used to determine whether an appointment has such a duration entry is to search for appointments with ending times near midnight (e.g., in the Palm OS, the ending time may be set to 11:59 pm, which is not ordinarily available for use by a user making a manual entry of an appointment ending time).

To preserve the correct appearance in certain calendar views on the device, an appointment that bridges a day boundary may be repeated on both days. The entry on the second day is not accurate at a detailed level (as it shows the start time on the prior day), but the view on certain of the device's calendar views (e.g., dots indicating appointments on the Palm OS monthly view, or bold face in Outlook) will correctly show that there is an appointment on both days (i.e., a portion on day one, and a portion on day two).

The new time-zone application is also useful for synchronizing the PIM database with a server with more sophisticated time-zone capability. The server with which the synchronizing occurs can interrogate the time-zone application on the local device to determine the time zone of the entries in the local device's PIM database. Knowing the time zone, it can convert the entries to a universal time when processing the entries in the synchronization.

FIGS. 1-4 are flow charts showing the steps followed by various embodiments of the invention.

One platform on which embodiments of the invention can run is the Palm platform, which is in common use in a variety of handheld devices. The time-zone application installed on the Palm platform allows a user to select the time zone used by the Palm handheld. The Palm handheld uses this time zone for data display and entry, specifically, for calendar dates and times, as well as e-mail postmark dates and times. The server to which the handheld connects stores all times in a universal time format (GMT), and performs the necessary conversions for a given time zone. Time zone conversion supports users that travel across time zones and meetings and appointments where attendees are geographically dispersed.

Installing the time-zone application generates a default time zone setting. By default the software installs support for all available time zones on the Palm handheld, and it sets the current time zone to the one being used on the PC used for the installation. The PC's operating system determines the time zones that are available. The default time zone settings may be viewed by selecting Time Zone Support for PalmPilot Organizers. The Time Zone for Palm Computing Platform opening dialog box (FIG. 9) appears. This dialog box displays the default settings. The scroll bars may be used to view the entire list of available time zones.

Figure 9:
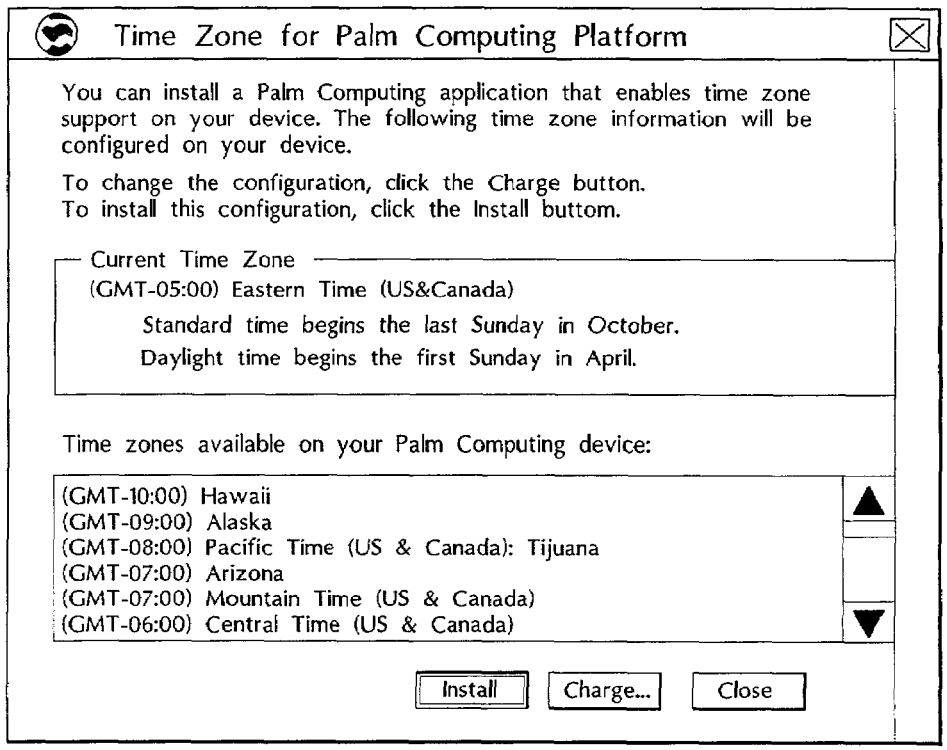
FIGS. 9-11 are screen shots showing the interfaces with which the user installs an embodiment of the time-zone application.
Figure 10:
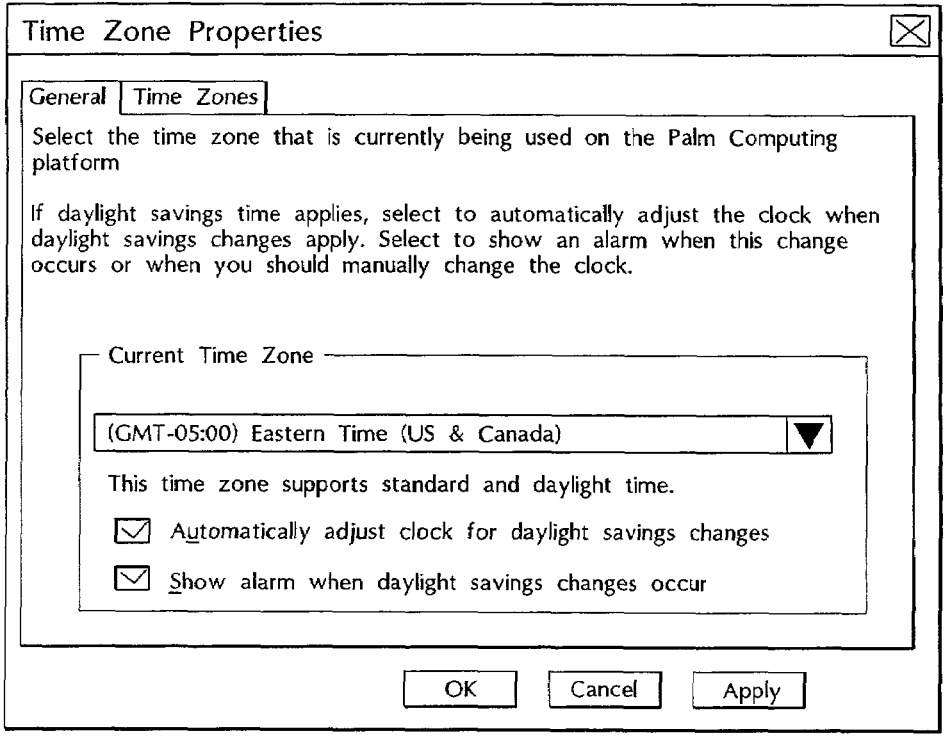

To change time zone settings for the Palm handheld, the Time Zone Support for Palmpilot Organizers is selected, to open the Time Zone for Palm Computing Platform dialog box (FIG. 9). The user clicks Change to modify settings. This brings up the Time Zone Properties dialog box (FIG. 10).

The user chooses the General tab to change the current zone on the handheld. If the user wants a time zone that supports both standard and daylight savings time, the user can specify additional options. One option indicates whether the time zone application should automatically adjust for daylight savings changes; another specifies whether the user wants to be notified, via alarm, when a change to and from daylight savings time occurs. The user can also set these options from the Palm handheld.

Figure 11:
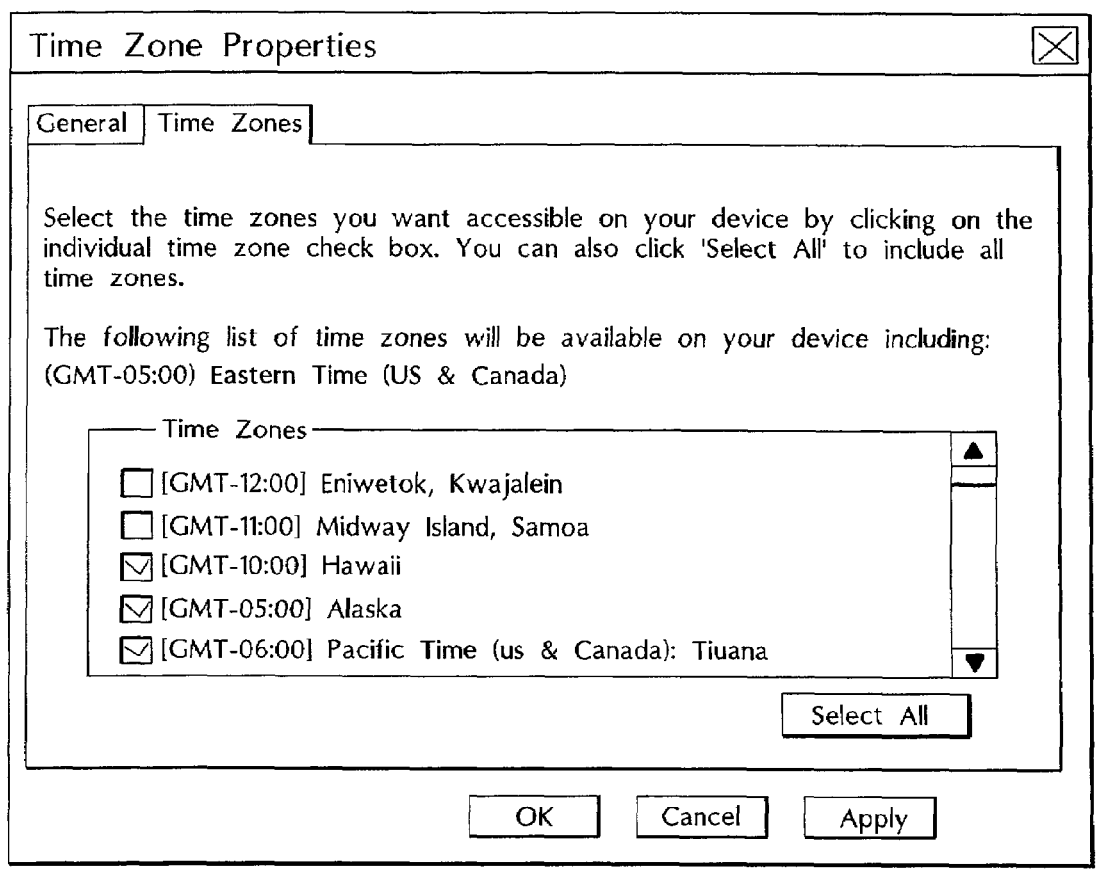

The user may then choose the Time zones tab (FIG. 11) to customize the list of time zones that displays on the Palm handheld. Checkboxes are checked or unchecked to select time zones.

Figure 7:
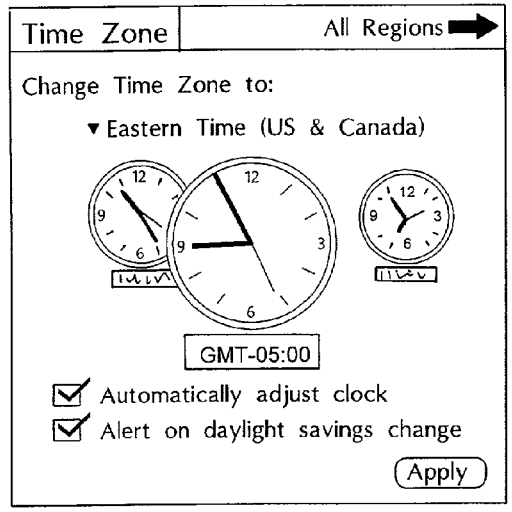
FIGS. 7 and 8 are screen shots showing two of the interfaces with which the user selects a time zone and the treatment of daylight savings time adjustments.
Figure 8:
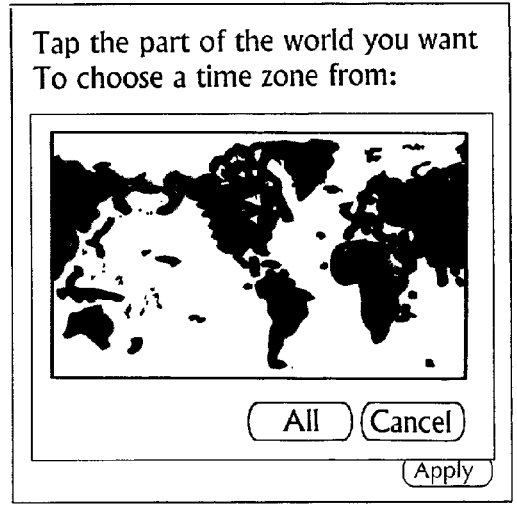

To set the current time zone from the Palm handheld, Time Zone is selected from the application screen. The Time Zone dialog boxes (FIGS. 7 and 8) appear. The desired time zone is selected, and details for that time zone appear. If the user selects a time zone that supports both standard and daylight time, the user can specify additional options by clicking the corresponding check box. A Change Time Zone dialog box then appears, with an Update calendar/e-mail records option checked. If this checkbox is left checked, then the time-zone application will adjust all calendar events and e-mail records to the selected time zone. Typically, this is what the user will want to do. Once the user selects this checkbox, it is advisable to leave it in its checked state so that all events and records uniformly observe the current time zone. If the user clicks this box to uncheck the box, the time-zone application adjusts only future calendar events and e-mail records to use the selected time zone. Other calendar events and e-mail records are left unchanged.

When entering appointments for events occurring in other time zones, one must enter the event in the correct time for that zone. For example, suppose one is located in Paris and needs to schedule an 8:00 pm event in Tokyo for a given date. One would enter the event based on Paris time, which is seven hours earlier (during daylight savings time), and so would enter the appointment as 1:00 pm. When one goes to Tokyo and changes the time zone to Tokyo's time zone, the event time will be correctly displayed as 8:00 pm. Another way to do this is to select the current time zone for Tokyo on the handheld, enter the appointment in Tokyo time, then switch back to the current time zone.

The time-zone application is capable of handling appointments that span over two or more days. An appointment of this type can result from time zone adjustments. For example, suppose a user has an appointment that goes from 8 pm to 11:30 pm, and his device is set for Pacific standard time. If he chooses to change the device time zone to Eastern standard time, he will cause all appointments to shift forward three hours. This causes the appointment to appear as 11:00 pm to 2:30 am. This may make the existing appointment invalid according to the operating system running on the handheld device.

Figure 5:
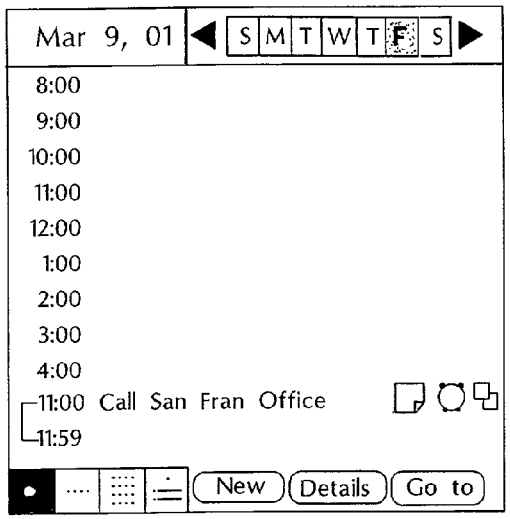
FIGS. 5 and 6 are screen shots showing the presentation of an appointment that crosses an end of day boundary.
Figure 6:
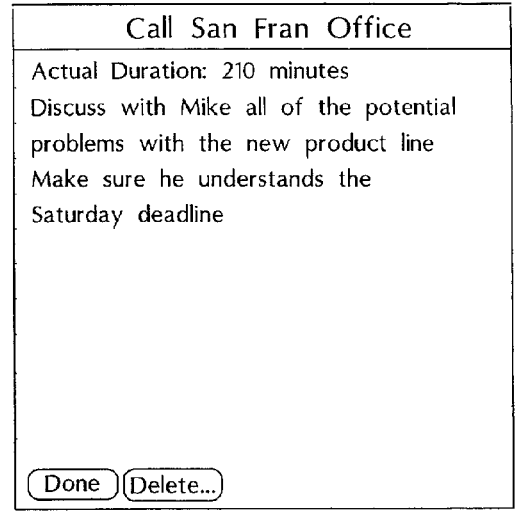

When this situation occurs—the time-zone application forcing an appointment to cross an end of day boundary—the appointment is changed into a two-day repeat (an exception is when the adjusted appointment ends exactly at midnight). The time-zone application adds a tag field containing the appointment duration to the appointment Note field, and the end time of the appointment is chopped to 11:59 pm. In the case of the 8:00 pm to 11:30 pm example, the appointment is changed to appear as follows: (1) the appointment becomes 11:00 pm to 11:59 pm (FIG. 5); (2) the Note field is modified to include "Actual Duration: 210 minutes" (FIG. 6); (3) the record becomes a daily repeat for a length of two days. This latter action may provide an incorrect low-level view, but a correct high level view, of the appointment (e.g., showing that he has an appointment on two consecutive days).

A number of embodiments of the invention have been described. Nevertheless, it will be understood that various modifications may be made without departing from the spirit and scope of the invention. Accordingly, other embodiments are within the scope of the following claims.

What is claimed is:

1. A computer implemented method of providing time-zone capability to existing personal information management (PIM) software that lacks time-zone capability, the method comprising:
   executing the existing PIM software;
   executing e-mail software; and
   executing a time-zone application in parallel with the existing PIM software, wherein the time-zone application
   determines that there has been a change in time zone; and
   changes times of appointments stored in the PIM software to reflect the new time zone and wherein the creation time of e-mails stored in a user's outbox in the e-mail software, but not yet sent, is adjusted in response to a time zone change.

2. A computer program product including at least one computer-readable storage medium having computer-readable program code portions stored therein, the computer-readable program code portions including executable portions comprising computer software, for providing time-zone capability to existing personal information management (PIM) software that lacks time-zone capability, comprising instructions for
   executing the existing PIM software;
   executing e-mail software; and
   executing a time-zone application in parallel with the existing PIM software, wherein the time-zone application
   determines that there has been a change in time-zone; and
   changes times of appointments stored in the PIM software to reflect the new time zone and wherein the creation time of e-mails stored in a user's outbox in the e-mail software, but not yet sent, is adjusted in response to a time zone change.

3. The subject matter of claim 1 or 2 wherein a user of the software picks a default time zone at the outset of using the time-zone application.

4. The subject matter of claim 1 or 2 wherein the time-zone application chooses a default time zone based on the local clock time of the device to which the time-zone application is initially downloaded.

5. The subject matter of claim 1 or 2 wherein daylight savings time adjustments to appointments stored in the PIM software are made either automatically or with a prompt to a user asking if the adjustment should be made.

6. The subject matter of claim 1 or 2 wherein time zone changes to appointments are effected by adjustment to the system clock of the device operating the software.

7. The subject matter of claim 1 or 2 wherein the software gives a user the option of not changing appointment records in the PIM software upon changing time zones.

8. The subject matter of claim 1 or 2 wherein the existing PIM software lacks the capability to store an appointment that crosses a day boundary, so that the start time of the appointment is in one day, and the end time of the appointment is in a following day, and wherein
   the time-zone application enters the correct start time for the time-zone adjusted appointment,
   the time-zone application enters an end time for the time-zone adjusted appointment that is within the same day, and
   the time-zone application enters an appointment duration in a separate field of the appointment record.

9. The subject matter of claim 8 wherein the separate field comprises one of the Note field, the appointment description field, and an application specific field made available by the API of the PIM software.

10. The subject matter of claim 8 wherein, after the time zone changes so that the appointment no longer crosses a day boundary, the time-zone application reads the duration stored in the separate field, and uses the duration to determine the correct end time for the appointment.

11. The subject matter of claim 10, wherein the time-zone application thereafter removes the appointment duration data from the separate field in which it was stored.

12. The subject matter of claim 8 wherein the end time used for time-zone adjusted appointments that cross a day boundary is a time ending near midnight that a user would not ordinarily use for an ending time for an appointment.

13. The subject matter of claim 8 wherein an appointment that crosses a day boundary is repeated on both the start and stop day.

14. The subject matter of claim 13 wherein the appointment stored for the second day is not accurate at a view level that shows start and stop times but is accurate at a higher level view.

15. The subject matter of claim 14 wherein the higher level view comprises a view that only indicates whether an appointment exists on a particular day.

16. The subject matter of claim 1 or 2 wherein the time-zone application communicates with a server to which the existing PIM software synchronizes, and wherein the time-zone application can be interrogated by the server and provide the server with the time zone of the appointments stored in the existing PIM software.

17. The subject matter of claim 16 wherein the server uses the time zone acquired from the device running the existing PIM software to convert the times of appointments in the server to a universal time when processing the appointments in the synchronization.

18. A method comprising:
   Executing existing personal information management (PIM) software that lacks time-zone capability and lacks the capability to store an appointment that crosses a day boundary such that the start time of an appointment is in one day, and the end time of the appointment is in a following day; and
   Executing a time-zone application and e-mail software in parallel with the existing PIM software, wherein the time-zone application is configured to:
   Store an appointment duration in a separate field of an appointment record corresponding to each appointment;
   Determine that there has been a change in time zone;
   Change times of appointments stored in the PIM software to reflect the new time zone such that, in response to a determination that an appointment crosses a day boundary due to changing times of the appointments to reflect the new time zone, the changed times are determined based on the stored appointment duration; and
   Adjust the creation time of e-mails stored in a user's outbox in the e-mail software, but not yet sent, in response to the time zone change.

* * * * *